United States Patent [19]

Ahrweiler

[11] 4,213,748

[45] Jul. 22, 1980

[54] PRESS FOR COMPACTING MATERIAL TO FORM A TRAVELING WEB

[75] Inventor: Karl-Heinz Ahrweiler, Krefeld, Fed. Rep. of Germany

[73] Assignee: Eduard Küsters, Krefeld, Fed. Rep. of Germany

[21] Appl. No.: 35,344

[22] Filed: May 2, 1979

[30] Foreign Application Priority Data

May 6, 1978 [DE] Fed. Rep. of Germany ....... 2819943

[51] Int. Cl.[2] ........................... B30B 5/06; B29J 5/00; B29D 7/14

[52] U.S. Cl. ................................. 425/371; 425/364 R

[58] Field of Search ................ 425/363, 371, 364, 372

[56] References Cited

U.S. PATENT DOCUMENTS

| | | | |
|---|---|---|---|
| 3,881,852 | 5/1975 | Ahrweiler | 425/371 X |
| 3,926,542 | 12/1975 | Ahrweiler | 425/371 X |
| 4,017,235 | 4/1977 | Ahrweiler | 425/371 X |
| 4,105,387 | 8/1978 | Ahrweiler | 425/371 X |

FOREIGN PATENT DOCUMENTS

| | | | |
|---|---|---|---|
| 2206710 | 8/1973 | Fed. Rep. of Germany | 425/373 |

*Primary Examiner*—J. Howard Flint, Jr.

*Attorney, Agent, or Firm*—Kenyon & Kenyon

[57] ABSTRACT

A press for forming a traveling compacted web from initially uncompacted material has upper and lower continuously traveling metal belt spans vertically interspaced so the material can be carried between the spans. Each span has means for directly heating it conductively and for pressing it towards the other span for compacting and heating the material when carried between the spans. Side edge portions of the spans overhang the heating and pressure means to protect the latter from being contaminated by the material while it is in its uncompacted condition and during its compaction. These overhanging portions are not heated directly and are colder than the balance of the spans during operation of the press. Normally this results in the side edge portions being stressed undesirably by tension and other stresses. To overcome this, the side portions of the belt spans are made so that they are longer when the belts are at ambient temperature, so that when the belt areas between the side edge portions are heated with consequent longitundinal expansion, the side edge portions are substantially freed from tension and other stresses.

3 Claims, 4 Drawing Figures

PRESS FOR COMPACTING MATERIAL TO FORM A TRAVELING WEB

BACKGROUND OF THE INVENTION

Presses for compacting material into a traveling web or board, such as wood chipboard, basically have upper and lower continuously traveling metal belt spans which are vertically interspaced so that the starting material can be introduced and carried between the spans. Means respectively above and below the spans directly conductively heat the spans while pressing them towards each other so that the starting and gradually compacting material carried between the spans can be ultimately heated and compacted to produce the desired product such as chipboard. The means used to press and heat the spans can be relatively complicated so that friction between the means and the traveling belt span is not excessive. Therefore, if the means becomes contaminated by the material used, it can possibly be rendered inoperative.

Therefore, it is customary to make the belt spans wider than the transverse area encompassed by the heating and pressing means so as to shield the latter from possible contamination. In addition, the wider belt spans permit some transverse wandering of the spans.

The heating-pressing means conducts heat directly into the major transverse portion of the metal belt spans, but the overhanging or transversely extending side portions are heated only by conduction through the relatively thin metal belt and they are exposed to the ambient atmosphere. With the traveling belt spans made as usual, a condition results wherein the side edge portions of the belts must operate at a substantially lower temperature than the balance of the belt material between the side portions. Consequently, when going from ambient temperature to press-operated temperature, the belt spans thermally expand longitudinally, excepting for their cooler side edge portions, this throwing these side edge portions into tension. The tension stress and other resulting stresses causes deformation of the belt spans. Such deformation is generaly undesirable, but at the feeding end of the belt spans can result in uneven feeding of compacted material which is to travel between the belt spans while being heated and compressed.

The above indicated problem has been treated by the West German Patent DE-OS 22 43 465. However, this concerns heating the side edge portions of the belts under the control of instrumentation which is very expensive.

SUMMARY OF THE INVENTION

The present invention solves the problem indicated by the foregoing by making the side edge portions so that they are longer than the belt span area therebetween when the span and its side edge portions are at ambient temperature or, in other words, cold. Consequently, when a press using the belt spans provided with such side edge portions is put into operation, the metal belt span area between its side edge portions which are free from the pressing and heating means, expands longitudinally as usual, but, however, the side edge portions which overhang such means for the reasons described, are not thrown into excessive tension.

One way to make the belt span edge portions longer is to corrugate these portions transversely with respect to the belt spans and with the corrugations fading smoothly into the belt portions therebetween. Another way is to make the side edge portions so thay they are initially under compression at ambient temperatures, heating of the belt spans between the side edge portions then resulting in relaxation of this compression.

To make the belt spans with the side edge portions under longitudinal compression, these portions can be made as separate metal strips, the main or principal belt span portions therebetween being longitudinally elastically stressed under tension and while under this tension the side edge portions being edge welded to form the complete belt. Preferably the side edge portions or strips are forcibly cooled during the welding. After the welding and release of the tension the result is a length of metal belt having side edge portions held compressed, and, therefore, containing a greater length of metal, by the balance of the metal belt.

DESCRIPTION OF THE DRAWINGS

A specific example embodying the principles of the present invention is illustrated by the accompanying drawings in the form of a press, such as used to make chipboard, the various Figures being as follows.

DETAILED DESCRIPTION OF THE INVENTION

Figure 1:
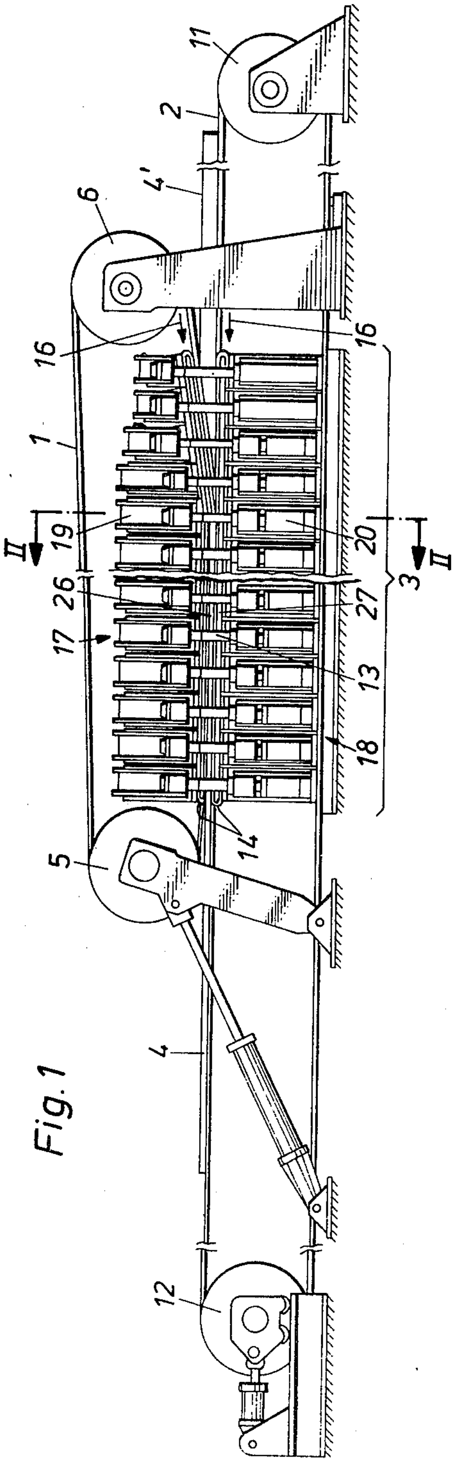
FIG. 1 is a side view of the entire press.

Referring to the above drawings, the continuous wood chipboard press is shown as providing an upper metal belt span via an upper endless belt 1 and a lower metal belt span via an endless metal belt 2. As usual, the metal belts, normally made of steel, are looped around drums 5 and 7 as to the upper belt, the lower belt being looped around drums 11 and 12. Although motors are not shown, it is to be understood that the belts 1 and 2 are driven so that their longitudinally opposite spans travel in the directions indicated by the arrow 16. The lower belt 2 extends backwardly from the thus indicated feeding end of the press so that it can be loaded with the uncompacted material, such as wood chips, indicated at 4', while the bottom loop is extended onwardly via the drum 12 to form a runout table for the compacted board shown at 4.

To press the belt spans between which the working material is held, there is an upper assembly 17 inside of the loop of the upper belt 1 while the lower belt loop has a generally corresponding assembly 18.

The assemblies 17 and 18 comprise individual beams 19 and 20 respective, which to provide the pressure of the belt spans, are clamped together outside of the belts by spindles 13. The beams 19 hold a pressure plate 26 and the beams 20 hold a pressure plate 27, the beams being forced together by hydraulic elements. The pressure plates 26 and 27 transmit pressure to the two belt spans respectively, and they contain heating chambers 40 in which either heating elements are installed or a heating fluid is conducted, depending on the design involved.

To reduce the friction between the pressure plates 26 and 27 and the belt spans, roller chains 14, which in each instance vertically run around the pressure plates 26 and 27, outwardly via channels 21 and with the rollers coming together between the pressure plates and the belt spans to form a transversely relatively uniform anti-friction pressure transmiting action.

It can be seen that the heating of the pressure plates, indicated at 40, heats the roller chains conductively with the latter directly conducting their heat to the metal belt spans and so to the web 4 being compacted and pressed. Incidentally, heating is used because in the case of chipboard, the wood chips are normally first impregnated with a heat-curable resin.

Now it can be seen that the means above and below the two metal belt spans for directly heating and pressing the spans towards each other is, for practical reasons, necessarily of a kind that can be contaminated and put out of action or reduced in efficiency if contaminated by the material being processed under heat and pressure between the two belt spans.

Figure 2:
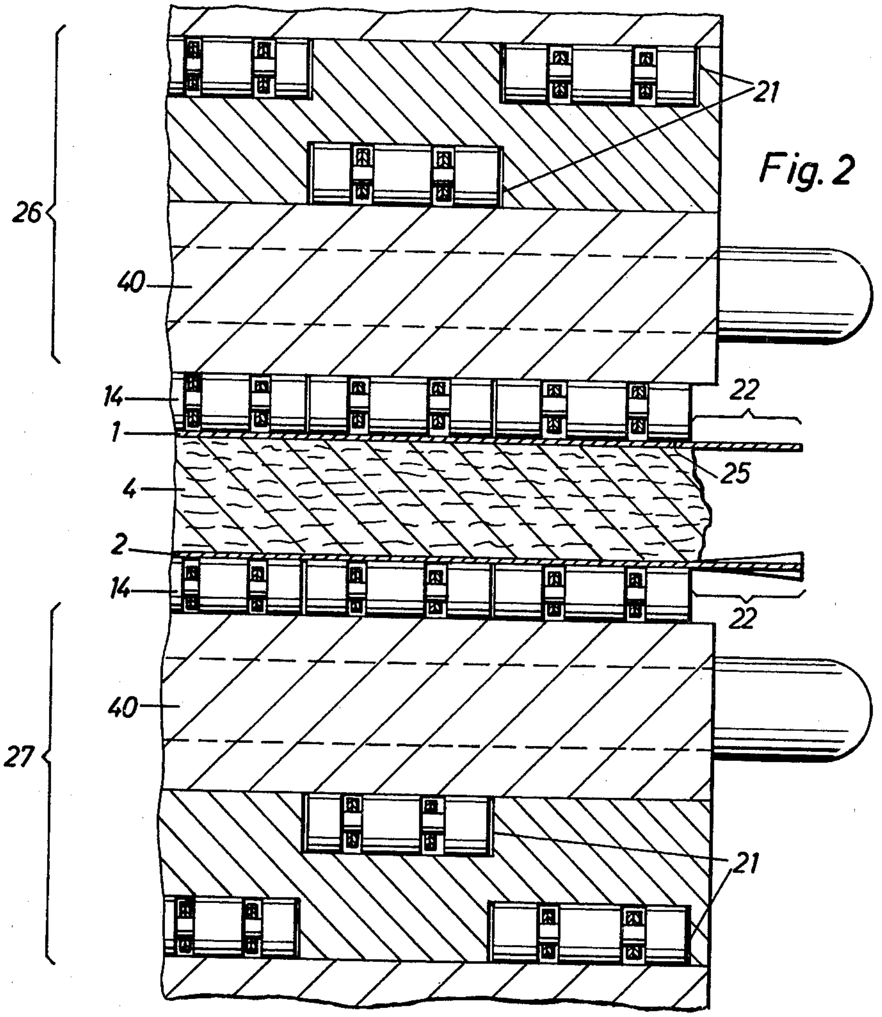
FIG. 2 is a cross section taken on the line II—II in FIG. 1.

Therefore, the metal belts are made wider than might otherwise be required to provide overhanging side edge portions indicated at 22 in FIG. 2. This provides insurance against the material 4, being compacted and heated, from contaminating the assemblies comprising the belt span heating and pressing means which, as can now be appreciated, may be an assembly of moving parts.

With the press starting from ambient temperature, and if the metal belts are as usual transversely flat throughout their extents, including their overhanging portions 22, as the press heats to operating conditions with the belts' main on working central portions directly heated by conduction as indicated, the portions 22 receive heat only via conduction through their relatively thin cross sections from the main portions of the belts while in addition they are exposed to air cooling by the ambient atmosphere. This results in the side edge portions thermally expanding longitudinally to a much less degree than the balance of the belts, resulting in the side edge portions being drawn into a relatively high tension and consequently being unduly stressed and possibly causing belt unevenness on the part of the lower belt at the feeding end of the machine. This, in turn, can cause ununiform feeding of the uncompacted starting material.

According to the present invention, this relatively high tensioning of the side portions 22 is reduced or eliminated by making these side portions so that they are, in effect, longer than the balance of the belts. This means that when the heated belt portions expand, there is an excess of material in the side portions 22 so that they can longitudinally expand relatively free from tension with thermal expansion of the main portions of the belts.

Figure 3:
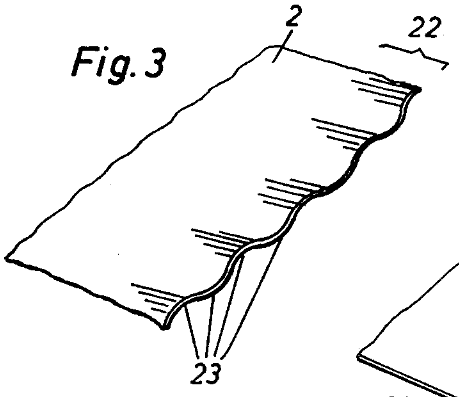
FIG. 3 is a perspective view showing the strip edge portion when using the corrugated principle.

One way to do this is illustrated by FIG. 3 wherein the lower belt has its edge portions 22 formed with transverse corrugations 23 which, as illustrated by FIG. 3, in particular, gradually fade or reduce in crest and valley height inwardly with respect to the belt. In this case the metal belt is integrally formed as a single piece transversely, the corrugations being formed in the belt metal itself. In this case, the longitudinal elastic stretchability of the side edge portions 22 is easily understandable. The side edge portions can be substantially completely relieved of tension as the press belts go from ambient to operating temperatures or during changes in operating temperatures.

Figure 4:
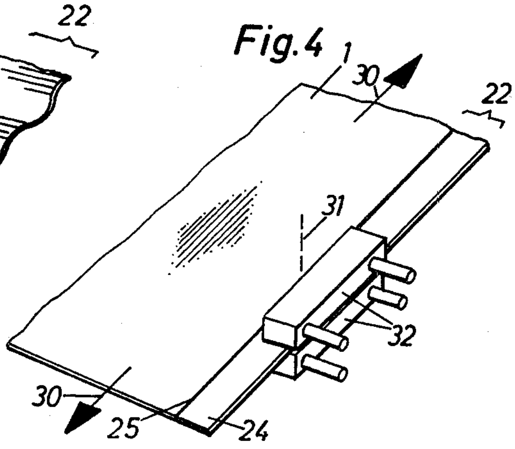
FIG. 4 is a perspective view showing the manufacture of the metal belt when incorporating the welded side edge portion which at ambient temperature is under compression.

In FIG. 4 the side edge portions are initially made separate from the balance of the belt spans. To make the complete belt, the main or working portions are elastically stretched under adequate tension directed as indicated by the arrows 30 and is held in this stretched condition. Then the side edge portions 22, which in this case are in the form of separate strips 24 of the same gauge or thickness as the balance of the belts, and under no tension, are welded by a torch directed as indicated at 31 while the strip or separate portions 24 are forcibly cooled as by the water-cooling members 32 shown in FIG. 4. Such forced cooling is optional but desirable.

After the separate strips 24 are edge welded to form the complete metal belt width, the tension indicated at 30 is released, the main or working portion of the metal belt material then elastically springing back longitudinally and placing the side edge portions 24 under compression. Being under compression, the length of the side edge portions 24 is effectively longer than the longitudinally uncompressed balance of the belt material.

With the form of the invention shown by FIG. 3, it is hardly possible for the belt side edge portions 22 to be thrown into undesirable tension under normal press operating conditions. Therefore, the main or central portion of the belt material is not thrown into compression so as to possibly buckle or introduce undesirable stress in general. In the case of the form of the invention shown by FIG. 4, it is theoretically possible that longitudinal thermal expansion of the working portion of the belt might use up the side portion length stored by the compression, ultimately resulting in this side portion 24 being thrown into tension with consequent longitudinal compression on the working portion of the belt. However, the stresses occurring are not nearly so great as would otherwse be experienced.

What is claimed is:

1. A press for forming a traveling compacted web from initially uncompacted material and comprising upper and lower continuously traveling metal belt spans which are vertically interspaced so said material can be carried therebetween, at least one of said belt spans at ambient temperature having side edges portions which are longer than the belt span area between the side edges portions and means respectively above and below said spans for directly heating and pressing the spans towards each other while said material is carried therebetween, said at least one of said belt spans having its said side edge portions overhanging said means and free from direct heating thereby, and its said area between said side edge portions directly heated by said means so that said area expands longitudinally, said side edge portions lengthening without being excessively stressed by tension.

2. The press of claim 1 in which said side edge portions are longer because they are formed with corrugations which gradually fade into said span area.

3. The press of claim 1 in which said side edge portions are longer because they are longitudinally compressed.

* * * * *